United States Patent [19]
Johnson

[11] Patent Number: 5,265,726
[45] Date of Patent: Nov. 30, 1993

[54] METHOD AND APPARATUS FOR POSITIVE POSITIONING OF SLIDES

[76] Inventor: Richard A. Johnson, 319 Diablo Rd., Ste. 200, Danville, Calif. 94526

[21] Appl. No.: 901,925

[22] Filed: Jun. 22, 1992

[51] Int. Cl.$^5$ ............................................. G03B 23/04
[52] U.S. Cl. .................................... 206/456; 353/120
[58] Field of Search ............... 206/387, 449, 455, 456, 206/493; 353/103, 104, 116, 117, 119, 120, 121, 122, DIG. 1, DIG. 5

[56] References Cited

U.S. PATENT DOCUMENTS

| | | | |
|---|---|---|---|
| 3,480,356 | 11/1969 | Dimitracopoulos | 353/116 |
| 3,490,840 | 1/1970 | Eagle | 353/120 |
| 3,504,967 | 4/1970 | Hipp, Jr. | 353/120 |
| 3,721,494 | 3/1973 | Stine | 353/103 |
| 4,105,319 | 8/1978 | Wells et al. | 353/120 |
| 4,605,127 | 8/1986 | Magnussen, Jr. | 206/493 |
| 4,674,000 | 6/1987 | Lee | 206/387 |
| 4,858,003 | 8/1989 | Wirt et al. | 353/120 |
| 4,863,025 | 9/1989 | Wolf | 206/387 |

Primary Examiner—Jimmy G. Foster
Attorney, Agent, or Firm—Paul Michael Vuksich

[57] ABSTRACT

A method and apparatus for positioning slides in a slide tray for either front or rear projection, so that all slides align top to bottom and side to side in a slide tray. Whether viewing either by front or rear projection, a slide is loaded with the image upside down into a slide tray. Through the use of rectangular guides mounted on opposite sides down the length of a reversible slide tray top, which guides, when viewed in cross-section, are symmetric to the vertical centerline of the slide at the approximate meeting of the slide and the top in the slide tray, whereby if the top is reversed the guides maintain their left and right relationship to said centerline but reverse their up and down relationship, all slides bearing a rectangular cutout in the top edge of each slide frame, which cutout is just able to receive either guide, are properly oriented in the slide tray for front or rear projection only if the top seats.

8 Claims, 3 Drawing Sheets

Axis Reference

Axis Reference

Axis Reference

METHOD AND APPARATUS FOR POSITIVE POSITIONING OF SLIDES

BACKGROUND

1. Field of Invention

This invention relates to slide trays for slide projectors.

2. Description of Prior Art

A slide projector is used to project either to a front or to a translucent reverse screen. Generally, slide projectors utilize a slide tray with a locking top. A slide may be positioned into a slot in the slide tray in one of eight positions, each of four sides up and to the front and rear. Only one position is correct. Heretofore, aids for the orientation of slides included color coding and labelling. Nevertheless, each of these aids required the projectionist to review each slide for orientation as it was loaded into the slide tray. Even then, the projectionist was free to make an error in orientation of the slides.

SUMMARY OF INVENTION, OBJECTS AND ADVANTAGES

Several objects and advantages of the present invention are:

(a) to provide for visual alignment of the slides by a projectionist viewing the alignment of a cutout in the slide frame;

(b) to provide confirmation of a projectionist's visual alignment of slides by means of a tray cover which will not seat if all the slides are not in proper alignment;

(c) to provide for carryover from machine processed film orientation in a slide frame bearing a cutout to positive orientation of slides in the slide tray by a projectionist; and (d) to provide a design adaptable to inexpensive modification of existing slide tray covers and slides to benefit from the invention.

Still further objects and advantages will become apparent from a consideration of the ensuing description and drawings.

DRAWING FIGURES

In the drawings, closely related figures have the same number but different alphabetical suffixes.

REFERENCE NUMERALS IN DRAWINGS

Figure 1:
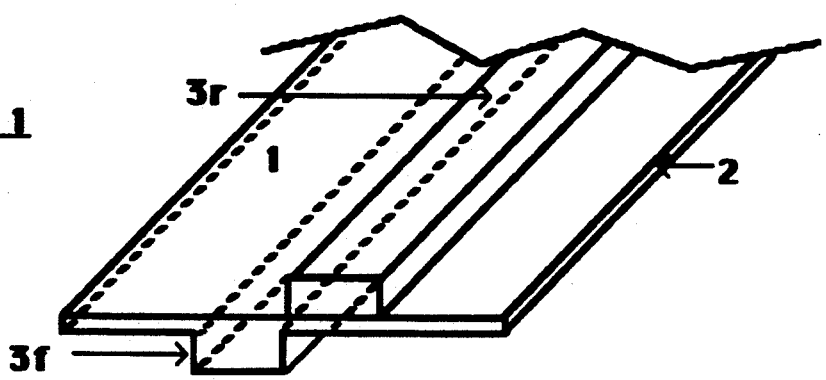
FIG. 1 shows a cross-section perspective of common elements of either a circular or rectangular slide tray cover.

1. Slide tray cover
2. Slide tray cover wall
3f and 3r. Slide alignment protrusions, front and rear projection respectively
4. Slide, including film and slide frame
5. Slide cutout for receipt of slide alignment protrusions 3f and 3r
6. Slide tray cover seating lips for a rectangular slide tray
7f and 7r. Cover reversing protrusions for rectangular cover, front and rear projection respectively
8. Slide tray side wall cutouts for receipt of slide tray cover alignment protrusions 7f or 7r for a rectangular slide tray

DESCRIPTION—FIGS. 1 AND 2

Figure 1F:
FIGS. 1F and 1R show a cross-section of FIG. 1 reversed around the designated X-axis.
Figure 1R:

FIG. 1 shows a cross-section perspective of common elements of the apparatus forming a slide tray cover at the point of loading a slide into a projector. FIGS. 1F and 1R show FIG. 1 in cross-section, reversed around the designated X-axis. The cover is designated by general reference numeral 1. Cover 1 of the slide tray is formed by a wall 2 of variable thickness and surface area, and slide alignment protrusions 3f and 3r which are located on opposite sides of wall 2. Wall 2 is of dimension to act as a cover for a slide tray. In cross-section, slide alignment protrusions 3f and 3r form equal rectangles, typically of width 1.27 cm and height 0.5556 cm., which rectangles when cover 1 is seated on the slide tray, are symmetric to the vertical centerline of the large surfaces of a slide loaded into the slide tray. In length, slide alignment protrusions 3f and 3r form continuous guides of uniform dimension down cover 1, e.g.; for a annular cover, the alignment protrusions form uniform, rectangular rings; for a rectangular cover, the protrusions form rectangles. The surfaces of cover 1 bear appropriate legends for front or rear projection.

Figure 2F:
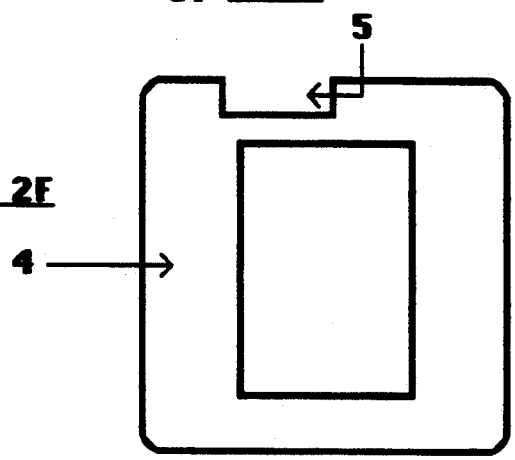
FIGS. 2F and 2R show a slide, same side up but reversed around the designated Y-axis.
Figure 2R:
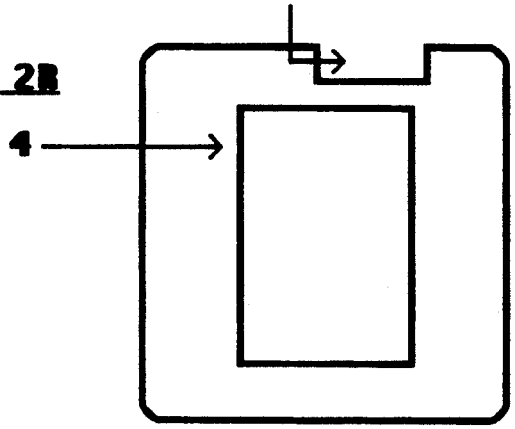

FIGS. 2F and 2R show a front and rear view respectively of a slide, said slide designated by general reference numeral 4. Numerals 5f and 5r represent the front and rear views of a single cutout, slide cutout 5, in the top edge of slide 4 ("top" in relation to the top of the slide when loaded in the tray with the film image loaded upside down), said slide cutout 5 being of the same shape but slightly larger dimension than slide alignment protrusions 3f and 3r. In operation, the "up" edge of slide 4, bearing cutout 5 as depicted in FIGS. 2F and 2R, is approximately flush with the bottom of cover 1.

OPERATION—FIGS. 1 AND 2

A typical embodiment of a slide's alignment for front projection at its point of loading into the projector is illustrated by FIG. 1F and FIG. 2F. In use, the legend on cover 1 for either front or rear projection is read by a projectionist to determine the proper "up side" of cover 1 for front projection. Then the projectionist visually aligns protrusion 3f with slide cutout 5 in the 5f position for all slides in the slide tray. Cover is then seated to the slide tray to ensure positive alignment of all slides. If cover 1 will not seat, one or more of the slides are not properly aligned for front projection. Corrective action is removal of cover 1 and visual inspection and alignment of cutout 5 for all slides until cover 1 will seat.

A typical embodiment of a slide's alignment for rear projection at its point of loading into the projector is illustrated by FIG. 1R and FIG. 2R. In use, the legend on cover 1 for either front or rear projection is read by a projectionist to determine the proper "up side" of cover 1 for rear projection. Then the projectionist visually aligns protrusion 3r with slide cutout 5 in the 5r position for all slides in the slide tray. Cover 1 is then seated to the slide tray to ensure positive alignment of all slides. If cover 1 will not seat, one or more of the slides are not properly aligned for rear projection. Corrective action is removal of cover 1 and visual inspection and alignment of cutout 5 for all slides until cover 1 will seat.

DESCRIPTION—FIGS. 3, 4, AND 5

Figure 3A:
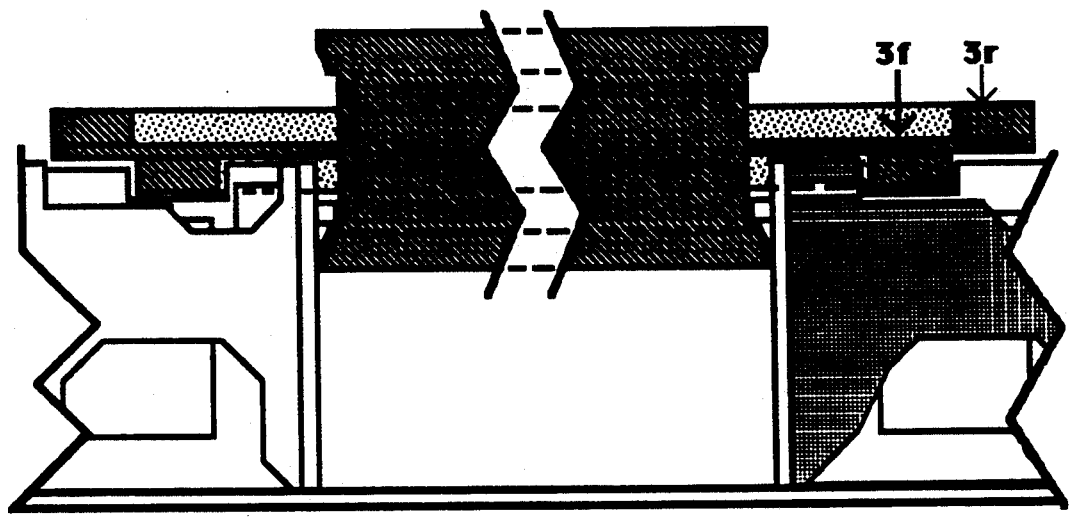
FIG. 3A shows a partial front-view cross-section of an annular slide cover seated on an annular slide tray.
Figure 3B:
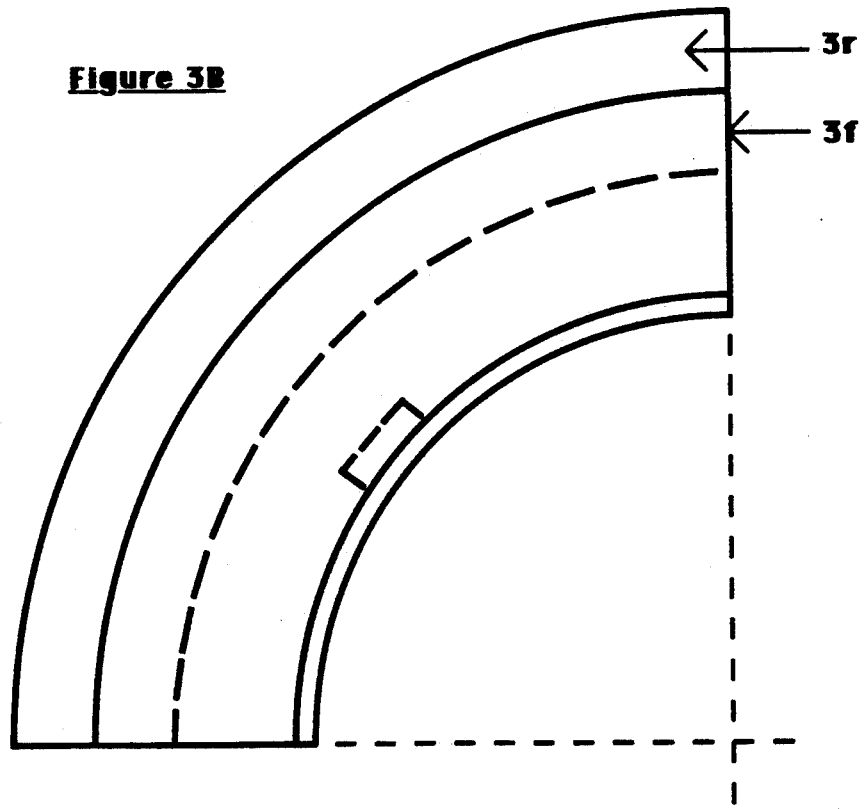
FIG. 3B shows a ¼ top view of an annular slide tray cover.

FIG. 3A shows a partial front-view, cross-section of an annular slide cover seated on an annular slide tray, the annular slide tray cover embodying the elements described in FIG. 1. FIG. 3B shows a ¼ top view of an annular slide tray cover, including the solid concentric, rectangular rings formed by slide alignment protrusions 3f and 3r and the concentric inner and outer sides of wall 2.

Figure 4:
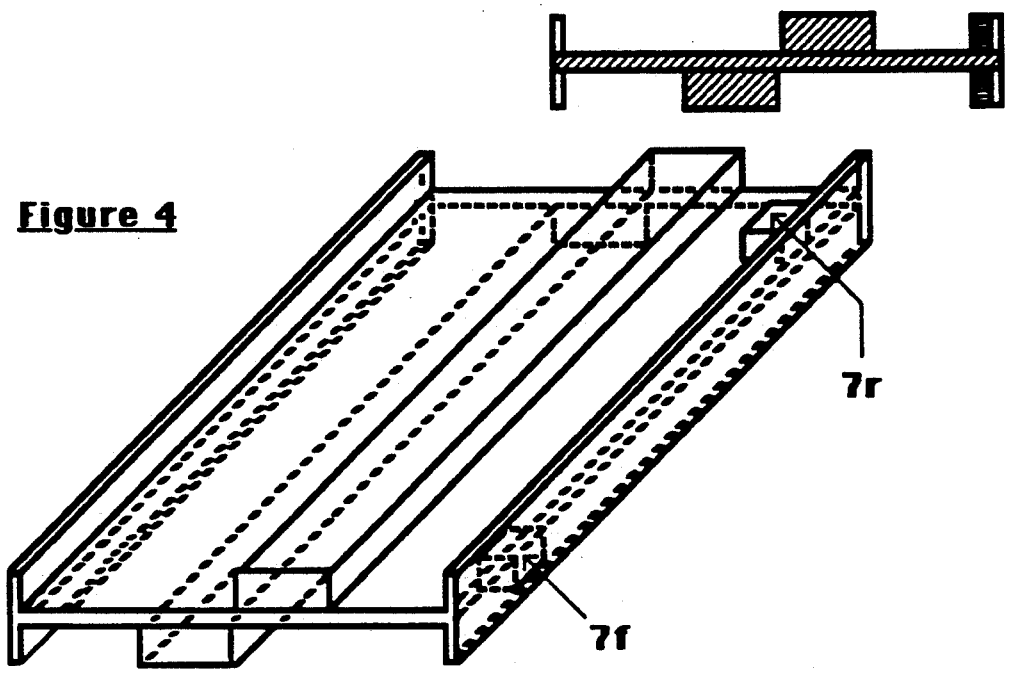
FIG. 4 shows a front-view perspective of a rectangular slide tray cover with locking protrusions.

FIG. 4 shows a front-view, cross-sectional perspective of a rectangular slide tray cover that embodies the elements described in FIG. 1. Additional elements shown are optional slide tray cover seating lips 6 and rectangular protrusions 7f and 7r, typically 0.5556 cm. in depth. and meeting corresponding cutouts, slide tray side wall cutouts 8, where cover 1 and a slide tray side walls seat. Slide tray cover seating lips 6 seat snugly over the slide tray side walls to a typical depth of 0.5556 cm.

Figure 5:
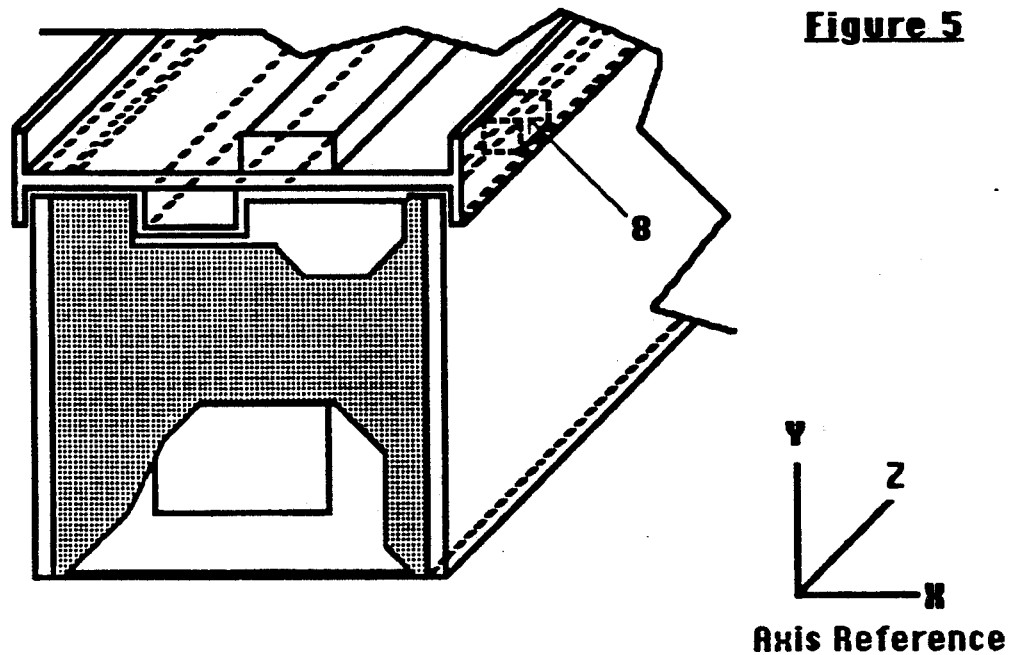
FIG. 5 shows a cross-section perspective of a rectangular slide tray with a visible slide positioned for front projection, the slide tray in position to receive the slide tray cover, FIG. 4.

FIG. 5 shows a cross-section perspective of a rectangular slide tray with a visible slide 4 positioned for front projection, the slide tray in position to receive the slide tray cover, FIG. 4, by the insertion of protrusions 7f into slide tray side wall cutouts 8.

OPERATION—FIGS. 3, 4 AND 5

Figure 2R:
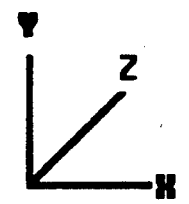

The operation of the elements of FIGS. 1 and 2 are the same for those elements embodied in FIGS. 3, 4, and 5. In the case of an annular slide tray arrangement, the concentric relationship depicted in FIG. 3 between protrusions 3f and 3r ensures that the protrusions will remain to the left and right respectively of the centerline as depicted in FIG. 1. In the case of a rectangular slide tray depicted in FIG. 5, cover 1 bears alignment protrusions 7f and 7r that will not mate in slide tray side wall cutouts 8 permitting a meeting between the slide tray cover and slide tray unless cover 1 is reversed so that protrusions 3f and 3r remain respectively left and right of each other in relation to the centerline in FIG. 1. Slide tray cover seating lips 6 for rectangular covers ensure a snug fit between the slide tray cover and the slide tray.

SUMMARY, RAMIFICATIONS, AND SCOPE

Thus the reader will see that the meeting of the alignment protrusions and slide cutout provides a positive means for ensuring the alignment of slides in a slide tray. This is particularly useful to align slides for front and rear projection. Furthermore, the invention has additional advantages in that:

it provides for visual alignment of the slides in the slide tray by a projectionist viewing the alignment of cutouts of slides;

it provides confirmation of a projectionist's visual alignment of slides by means of a tray cover which will not seat if all the slides are not in proper alignment;

it provides for carryover from machine processed film orientation in a slide frame bearing a cutout to positive orientation of slides in the slide tray by a projectionist; and it provides a design adaptable to inexpensive modification of existing slide tray covers and slides to benefit from the invention.

Although the description above contains may specificities, these should not be construed as limiting the scope of the invention but as merely providing illustrations of some of the presently preferred embodiments of this invention. For example, protrusion and cutout can have other matching shapes permitting insertion of the protrusion into the cutout including squares, half-circles, etc.; the protrusions could be movable rather than fixed via a slide, hinge, recess, etc.; the protrusion dimension down the long axis of the cover could be continuous or noncontinuous guide; cutouts could be of double dimension given in the embodiment with a sliding cover over one-half such dimension, or a sliding cutout of single dimension, etc.; the protrusions could be on a side wall or a bottom to a container; the protrusion wall could be curved, straight, etc.; the slides can be of any dimension and curvature; the slides can be replaced by cards, fiche, computer cards, blocks and other solids (including curving, corrugated, etc.) which can be stacked or aligned; in the standard slide tray where each slide is mounted in an individual slot in the tray, the top and bottom protrusions could be affixed not only for positive front and rear alignment but for specific ordering of slide in the slide tray, e.g. the top and bottom protrusions forming an X shape when viewed from above a rectangular cover would insert into cutouts in slides forming a diagonal corresponding to one diagonal of the X shape for front projection and the other diagonal for rear projection when the slides were arranged in proper viewing order and loaded into the rectangular slide tray; and the design supports a side loading slide projector with a removable top by removal of the cover bearing the protrusions after positive alignment of the slides but before projection of the slides.

Thus the scope of the invention should be determined by the appended claims and their legal equivalents, rather than by the examples given.

I claim:

1. An improved means for the positive orientation of film slides in a slide tray for front or rear projection, wherein the improvement comprises:
    (a) a reversible slide tray cover having a protrusion on each large surface forming the cover to the slide tray; and
    (b) a slide having a slide frame bearing a cutout able to receive the protrusion only when the slide and cover are in a proper orientation for front or rear projection.

2. The protrusions in claim 1 wherein the protrusions are parallel on the long axis of the slide tray cover.

3. The protrusions in claim 1 wherein the protrusions when viewed in cross-section are symmetric.

4. An improved means for the positive orientation of film slides in a slide tray for front or rear projection, wherein the improvement comprises:
    (a) a film slide tray having a bottom and sides and an open side;
    (b) a film slide for positioning in the film slide tray;
    (c) the film slide having a cutout;
    (d) a cover covering the opening of the film slide tray; and (e) the cover having a protrusion on the cover's inside surface, the protrusion adapted to engage the cutout when the film slide is positioned in the tray and the cover seated to the opening in the film slide tray.

5. The improved means as set forth in claim 4 wherein the film slide may be reversibly positioned in the slide tray.

6. The improved means as set forth in claim 4 wherein the cover is reversible.

7. An improved means for the positive orientation of film slides in a slide tray for front or rear projection, wherein the improvement comprises:

(a) a film slide tray having a bottom and sides and an open side;
(b) a film slide for positioning in the film slide tray;
(c) the film slide having a cutout;
(d) a cover covering the opening of the film slide tray; and
(e) the cover having a protruding structural means from the cover's inside surface, the protruding structural means adapted to engage the cutout when the film slide is positioned in the slide tray and the cover seated to the opening in the film slide tray.

8. The improved means as set forth in claim 7 wherein the film slide may be reversibly positioned in the slide tray.

* * * * *